United States Patent
Keller et al.

(10) Patent No.: US 11,140,598 B2
(45) Date of Patent: Oct. 5, 2021

(54) NETWORK INITIATED INTER-RAT HANDOVER

(71) Applicant: Telefonaktiebolaget LM Ericsson (publ), Stockholm (SE)

(72) Inventors: Ralf Keller, Würselen (DE); Afshin Abtin, Sollentuna (SE); Patrik Dannebro, Hisings Kärra (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 238 days.

(21) Appl. No.: 15/749,523

(22) PCT Filed: Nov. 17, 2017

(86) PCT No.: PCT/EP2017/079628
§ 371 (c)(1),
(2) Date: Feb. 1, 2018

(87) PCT Pub. No.: WO2019/001750
PCT Pub. Date: Jan. 3, 2019

(65) Prior Publication Data
US 2019/0007877 A1    Jan. 3, 2019

Related U.S. Application Data

(60) Provisional application No. 62/526,597, filed on Jun. 29, 2017.

(51) Int. Cl.
*H04W 72/04* (2009.01)
*H04W 36/14* (2009.01)
(Continued)

(52) U.S. Cl.
CPC .......... *H04W 36/14* (2013.01); *H04W 36/26* (2013.01); *H04W 36/32* (2013.01); *H04W 68/005* (2013.01); *H04W 88/02* (2013.01)

(58) Field of Classification Search
CPC .......... H04W 16/1432; H04W 68/005; H04W 88/02
See application file for complete search history.

(56) References Cited

U.S. PATENT DOCUMENTS 7,200,401 B1 * 4/2007 Hulkkonen ........... H04W 36/24
370/331
8,045,568 B2 * 10/2011 Sylvain ............. H04W 36/0022
370/401

(Continued)

FOREIGN PATENT DOCUMENTS

WO        2002085060 A2    10/2002
WO   WO-2015043662 A1 *    4/2015 ............. H04L 47/20
WO        2016196623 A1    12/2016

OTHER PUBLICATIONS

3GPP, Technical Specification Group Services and System Aspects; Procedures for the 5G System; TS 23.502 V0.4.0 (May 2017) (Year: 2017).*

(Continued)

*Primary Examiner* — Hassan Kizou
*Assistant Examiner* — Mahbubul Bar Chowdhury
(74) *Attorney, Agent, or Firm* — Coats & Bennett, PLLC

(57) ABSTRACT

A method of handing over a User Equipment, UE, from a first type of Radio Access Technology, RAT, to a second type of RAT, wherein said UE is attached to a core network via a Radio Access Network, RAN, utilizing said first type of RAT, said method comprising the steps of receiving, by a Mobility Management node in said core network from a network function in said core network, an indication that a particular service is to be invoked for said UE, determining, by said Mobility Management node, that said UE is to be handed over from said first type of RAT to said second type of RAT for supporting said particular service and requesting, (Continued)

by said Mobility Management node, said RAN to hand over said UE from said first RAT to said second RAT.

19 Claims, 8 Drawing Sheets

(51) Int. Cl.
*H04W 68/00* (2009.01)
*H04W 36/32* (2009.01)
*H04W 36/26* (2009.01)
*H04W 88/02* (2009.01)

(56) References Cited

U.S. PATENT DOCUMENTS

| | | | | |
|---|---|---|---|---|
| 2004/0205153 A1* | 10/2004 | Weisshaar | ............... | H04L 67/18 709/217 |
| 2011/0274090 A1* | 11/2011 | Hallensal | .......... | H04W 36/0022 370/331 |
| 2012/0257600 A1* | 10/2012 | Diachina | ........... | H04W 36/0022 370/332 |
| 2014/0068064 A1* | 3/2014 | Anchan | ................ | H04W 28/24 709/224 |
| 2014/0128081 A1* | 5/2014 | Olsson | ................. | H04W 48/18 455/437 |
| 2014/0373124 A1* | 12/2014 | Rubin | .................... | H04L 67/28 726/7 |
| 2016/0073450 A1* | 3/2016 | Vikberg | ................ | H04W 36/24 370/329 |
| 2017/0078938 A1* | 3/2017 | Pitkamaki | ............. | H04W 36/14 |
| 2017/0171782 A1* | 6/2017 | Mohamed | ......... | H04W 36/0011 |
| 2017/0295530 A1* | 10/2017 | Chen | .................... | H04W 36/14 |
| 2018/0192471 A1* | 7/2018 | Li | ..................... | H04W 72/0493 |
| 2018/0199398 A1* | 7/2018 | Dao | ..................... | H04W 36/14 |
| 2018/0376446 A1* | 12/2018 | Youn | ...................... | H04W 8/20 |

OTHER PUBLICATIONS

3rd Generation Partnership Project, "Technical Specification Group Services and System Aspects; System Architecture for the 5G System; Stage 2 (Release 15)", 3GPP TS 23.501 V2.0.0, Dec. 2017, pp. 1-183.

3rd Generation Partnership Project, "Technical Specification Group Services and System Aspects; Procedures for the 5G System; Stage 2 (Release 15)", 3GPP TS 23.502 V2.0.0, Dec. 2017, pp. 1-260.

3rd Generation Partnership Project, "Technical Specification Group Services and System Aspects; 3eneral Packet Radio Service (GPRS) enhancements for Evolved Universal Terrestrial Radio Access Network (E-UTRAN) access (Release 14)", 3GPP TS 23.401 V14.1.0, Sep. 2016, pp. 1-379.

* cited by examiner

NETWORK INITIATED INTER-RAT HANDOVER

TECHNICAL FIELD

The present invention generally relates to hand overs and, more particularly, to the handing over a User Equipment, UE, from a first type of Radio Access Technology, RAT, to a second type of RAT.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Certain issues may arise in telecommunication networks that exist nowadays. For example, particular services may be invoked for a particular UE, for example in case the UE has actually requested such a service, which may not be supported by the telecommunication network.

Another possible issue may be that the requested service may be provided by the telecommunication network but not within the Quality of Service, QoS, requirements that are required.

In any of these cases, the UE may not, or insufficiently, be serviced. That is, the service may be established for the UE but not with the required QoS, or the service may, in the end, not be established at all.

SUMMARY

It is an object of the present disclosure to provide for a methods for supporting the handing over a User Equipment, UE, from a first type of Radio Access Technology, RAT, to a second type of RAT.

It is another object to provide for network functions for supporting the handing over a User Equipment, UE, from a first type of Radio Access Technology, RAT, to a second type of RAT.

It is a further object to provide for a computer program product containing computer program code, which computer program code facilitates the method according to the present disclosure.

In a first aspect of the present disclosure, there is provided a method of handing over a User Equipment, UE, from a first type of Radio Access Technology, RAT, to a second type of RAT, wherein said UE is attached to a core network via a Radio Access Network, RAN, utilizing said first type of RAT.

The method comprises the steps of:

receiving, by a Mobility Management node in said core network from a network function in said core network, an indication that a particular service is to be invoked for said UE;

determining, by said Mobility Management node, that said UE is to be handed over from said first type of RAT to said second type of RAT for supporting said particular service;

requesting, by said Mobility Management node, said RAN to hand over said UE from said first RAT to said second RAT.

It was one of the insights of the inventors that it may be beneficial if the core network itself is able to determine, and instruct, the hand over of a particular UE. More specifically, the core network may decide itself that a particular UE is to be handed over from, for example, a 5G type of Radio Access Technology to a 4G Radio Access Technology, network. As such, the present method is directed to a core network initiated hand over of a particular UE.

More specifically, the method in accordance to the present disclosure may be used in a system fall back scenario, in which a particular UE is handed over from a 5G network to a 4G network, or vice versa.

In accordance with the present disclosure, the Mobility Management node may be an Access and Mobility Management Function, AMF, node in 5G telecommunication networks, or may be a Mobility Management Entity, MME, node in 4G telecommunication networks, for example.

The Radio Access Network, RAN, is, for example, a Next Generation, NF, RAN for accessing 5G types of core networks or a Long Term Evolution, LTE, RAN for accessing 4G types of core networks.

The particular service is, for example, a voice related service which may require a particular Quality of Service, QoS.

It is noted that the present disclosure described that the service is to be invoked on behalf of the particular UE. This may encompass the situation in which the service is also actually already being invoked, or is in the process of being invoked.

In an example, the method further comprises the initial step of:

subscribing, by said Mobility Management node, to said network function for receiving notifications whenever said particular service is to be invoked for said UE.

The advantage of the above described example is that the Mobility Management node is actively informed in case a particular service is initiated, i.e. invoked, for the particular UE. The Mobility Management node may then perform a decision whether that particular service may be supported, i.e. executed, by the first type of Radio Access Technology network or whether that particular service is to be executed by the second type of Radio Access Technology network.

The above described subscription may be issued for each of the UE's of the core network, or to a particular subset of UE's. This may, amongst other, depend on subscription of each of the UE's.

In a further example, the method further comprises the step of:

informing, by said Mobility Management node, said network function that said UE is to be handed over from said first RAT to said second RAT for said particular service.

The advantage hereof is that the network function may take appropriate actions whenever it is informed about the hand over. The network function may handle the invoked service differently, i.e. based on whether the UE is handed over to the second type of Radio Access Technology network or not.

In another example, the method further comprises the step of:

receiving, by said Mobility Management node, from said RAN, a confirmation that said UE is handed over from said first RAT to said second RAT;

transmitting, by said Mobility Management node, to said network function, said confirmation.

The confirmation may be a Modify bearer Request message if the request is buffered in SMF+PGW-C, an update message over Gx/N7 if the request is buffered in PCF and possibly a RAT change trigger if the request is buffered in AF.

The advantage hereof is that the network function is actively informed that the hand over is completed such that the network function is able to resume the process of establishing the particular service for the UE.

In a further example, the step of determining comprises:
determining, by said Mobility Management node, that said particular service requires a Quality of Service, QoS, that said first type of RAN is at least momentary not able to support.

In accordance with the present disclosure, the network function may comprise any of:
Session Management Function+Packet gateway node;
Policy Control Function, PCF, node;
Application Function, AF, node.

In a second aspect, there is provided a method of supporting the handing over a User Equipment, UE, from a first type of Radio Access Technology, RAT, to a second type of RAT, wherein said UE is attached to a core network via a Radio Access Network, RAN, utilizing said first type of RAT The method comprising the steps of:
receiving, by a network function in said core network, from a Mobility Management node in said core network, a subscription request for receiving notifications whenever a particular service is to be invoked for said UE;

determining, by said network function, that said particular service is to be invoked for said UE, and transmitting, by said network function, to said Mobility Management node, an indication that said particular service is to be invoked for said UE.

In accordance with the present invention, different aspects applicable to the above mentioned examples of the method directed to the Mobility Management node, including the advantages thereof, correspond to the aspects which are applicable to the method directed to the network function, according to the present invention.

In an example, the method further comprises the step of:
receiving, by said network function, from said Mobility Management node, an information message that said UE is to be handed over from said first RAT to said second RAT for said particular service;

suspending, by said network function, establishment of said particular service to be invoked for said UE.

In a further example, the method further comprises the steps of:
receiving, by said network function, a confirmation that said UE is handed over from said first RAT to said second RAT;

unsuspending, by said network function, establishment of said particular service to be invoked for said UE.

The above described examples describe the concept that the network function suspends the establishment of the requested service until a decision is made, by the Mobility Management node, whether the UE is to be handed over and, if so, whether the UE has actually been handed over to the second type of Radio Access Technology network.

More specifically, the above described concept described that the establishment of the particular service for the UE is put on hold until it is confirmed that the UE has actually been handed over to the second type of Radio Access Technology network.

In accordance with the present disclosure, the term unsuspending may be interchanged with resuming, continuing or anything alike. It is clear that the establishment of the particular services, which was suspended, is resumed again. The establishment is nog longer on hold.

In a third aspect of the present disclosure, there is provided a Mobility Management node arranged to operate in a core network and arranged for supporting handing over a User Equipment, UE, from a first type of Radio Access Technology, RAT, to a second type of RAT, wherein said UE is attached to a core network via a Radio Access Network, RAN, utilizing said first type of RAT.

The Mobility Management node comprising:
receive equipment arranged for receiving from a network function in said core network, an indication that a particular service is to be invoked for said UE;

process equipment arranged for determining that said UE is to be handed over from said first type of RAT to said second type of RAT for supporting said particular service;

transmit equipment arranged for requesting said RAN to hand over said UE from said first RAT to said second RAT.

In accordance with the present invention, different aspects applicable to the above mentioned examples of the methods, including the advantages thereof, correspond to the aspects which are applicable to the above described Mobility Management node, according to the present invention.

In an example, the node further comprises:
subscribe equipment arranged for subscribing to said network function for receiving notifications whenever said particular service is to be invoked for said UE.

In a further example, the node further comprises:
inform equipment arranged for informing said network function that said UE is to be handed over from said first RAT to said second RAT for said particular service.

In another example, the receive equipment is further arranged for receiving from said RAN, a confirmation that said UE is handed over from said first RAT to said second RAT, and wherein said transmit equipment is further arranged for transmitting, to said network function, said confirmation.

In yet another example, the process equipment is further arranged for
determining that said particular service requires a Quality of Service, QoS, that said first type of RAN is at least momentary not able to support.

In a fifth aspect of the present disclosure, there is provided a network function arranged for operating in a core network and arranged for supporting the handing over a User Equipment, UE, from a first type of Radio Access Technology, RAT, to a second type of RAT, wherein said UE is attached to a core network via a Radio Access Network, RAN, utilizing said first type of RAT, said network function comprising:

receive equipment arranged for receiving, from a Mobility Management node in said core network, a subscription request for receiving notifications whenever a particular service is to be invoked for said UE;

process equipment arranged for determining that said particular service is to be invoked for said UE, and transmit equipment arranged for transmitting an indication that said particular service is to be invoked for said UE.

In accordance with the present invention, different aspects applicable to the above mentioned examples of the methods and Mobility Management node, including the advantages thereof, correspond to the aspects which are applicable to the above described network function, according to the present invention.

In an example, the receive equipment is further arranged for receiving, from said Mobility Management node, an information message that said UE is to be handed over from said first RAT to said second RAT for said particular service, and wherein said node further comprises:

suspend equipment arranged for suspending establishment of said particular service to be invoked for said UE.

In a further example, the receive equipment is further arranged for receiving a confirmation that said UE is handed over from said first RAT to said second RAT, and wherein said suspend equipment is further arranged for unsuspending said establishment of said particular service to be invoked for said UE.

In an example, the node is any of:

Session Management Function+Packet gateway node;

Policy Control Function, PCF, node;

Application Function, AF, node.

In a fifth aspect, there is provided a computer program product containing computer program code which, when executed processor, cause the processor to implement the method according to any of the examples as provided above.

The above-mentioned and other features and advantages of the invention will be best understood from the following description referring to the attached drawings. In the drawings, like reference numerals denote identical parts or parts performing an identical or comparable function or operation.

DETAILED DESCRIPTION

Figure 1:
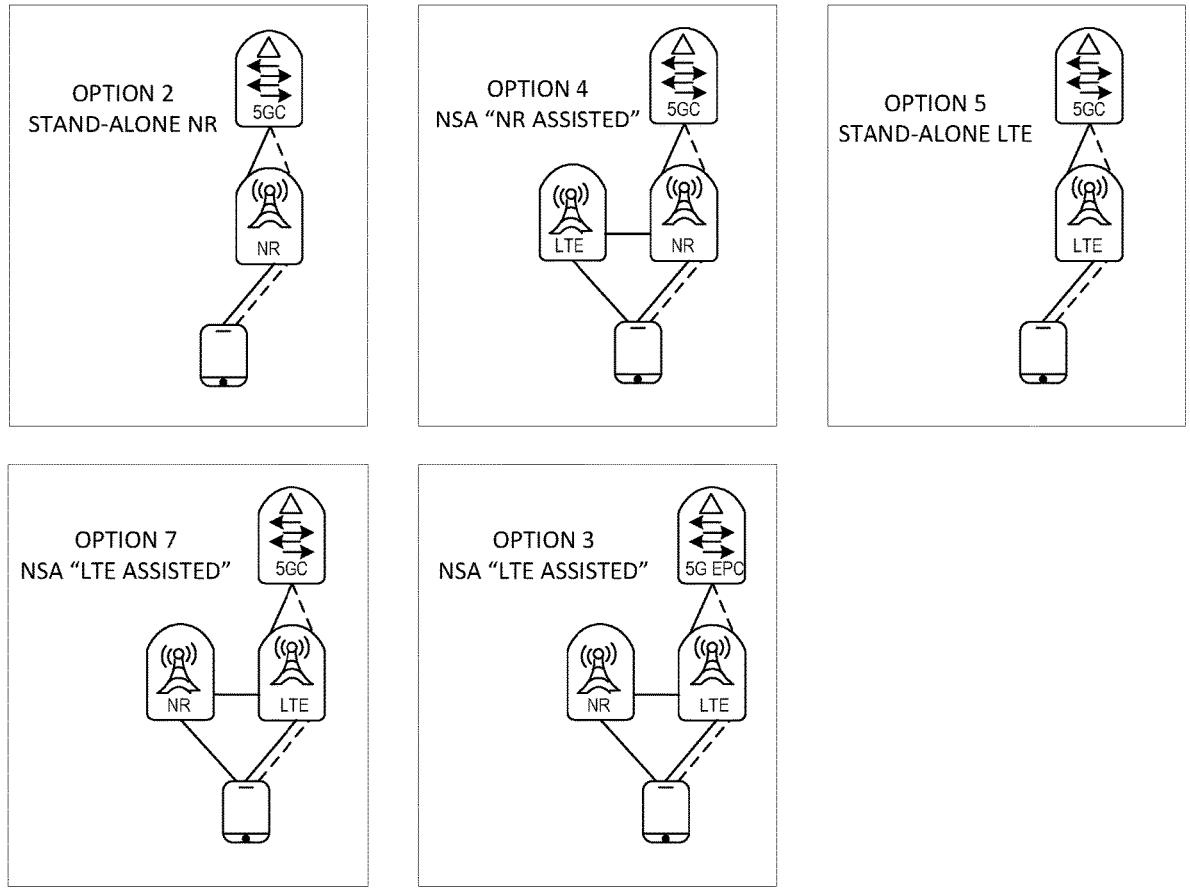
FIG. 1 shows a couple of scenarios in which the Radio Access Network, RAN, is involved.

FIG. 1 shows a couple of scenarios in which the Radio Access Network, RAN, is involved. Standardization work is ongoing on NR as a new radio access and 5GC, 5G Core Network, as a new packet core network. 3GPP RAN has defined a couple of scenarios as depicted in FIG. 1, for which work is either ongoing or planned.

There are additional Options 6 and 8, but neither RAN nor SA2 will work on them. As can be seen by the scenarios depicted in FIG. 1, both LTE and NR will be connected to the NGCN, Next Gen Core Network/5GC. LTE will also connect to EPC partly to serve legacy UEs but also new UEs utilizing Option 3, where NR is anchored in EPC/LTE, i.e. supported as an additional data carrier to LTE.

Figure 2:
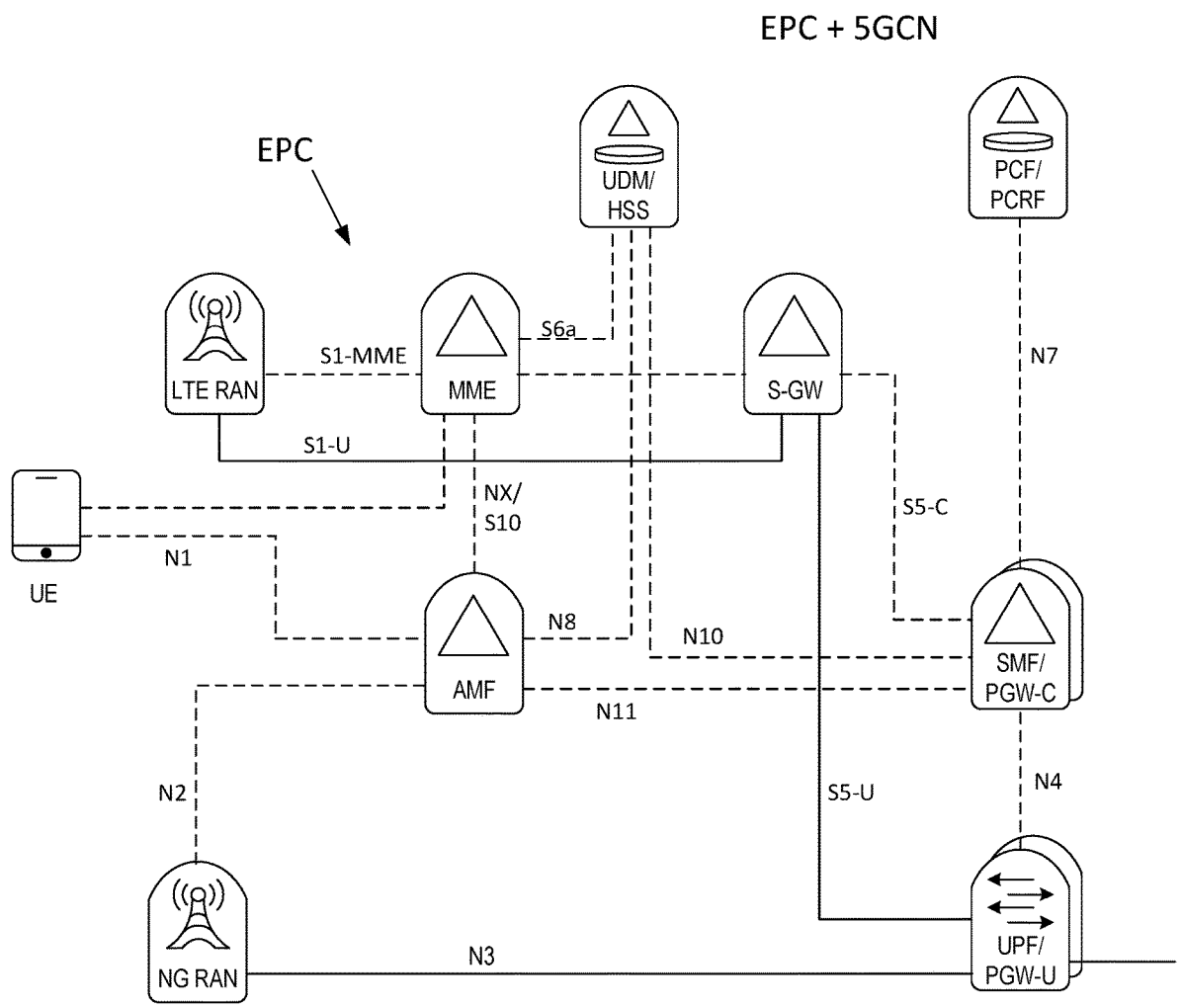
FIG. 2 shows a 5G core network architecture overview, including interworking to Evolved Packet Core.

FIG. 2 shows a 5G core network architecture overview, including interworking to Evolved Packet Core.

The RAN instructs the UE which neighbour cells to measure. The UE provides the measurement reports to the RAN, and then the RAN determines whether there is a need to perform handover to a cell of the same radio technology or to a cell of a different radio technology. Also, Single Radio Voice Call Continuity, SRVCC, from LTE to 2G/3G is normally initiated by an LTE eNB based on measurement reports.

The model shown in FIG. 2 enables that seamless interworking between the two LTE and NR/NG-RAN networks via procedures in EPC and 5GC. This implies, as an example, that a voice call over NG-RAN/5GC can be moved to LTE/EPC when both accesses are voice capable. It implies though that voice QoS is supported on both radio accesses.

There currently exist certain challenges. Currently, it is not possible to initiate a handover from 5G to 4G by the core network. This may be prevented either because the subscriber is not entitled to use voice on 5G, or because the network cannot serve voice, or additional voice, on 5G.

Certain aspects of the present disclosure and their embodiments may provide solutions to these or other challenges. In the following, we describe the solution from a 5G-RAN/5GC perspective interworking with LTE/EPC, but it is equally applicable also for LTE/EPC interworking with 5G-RAN/5GC.

For a Service Based Architecture, SBA, the Access and Mobility Function, AMF, could place a subscription at SMF+PGW-C, PCF or AF that the AMF wants to receive a notification when a service with 5G QoS Indicator, 5QI, for voice is used.

The AMF may only place this subscription when AMF knows the UE is in an area where the gNB does not support QoS required for voice. AMF can always place this subscription when it knows the UE have no subscription for voice in 5GS. When the UE is in an area where the gNB supports QoS required for voice, the AMF may remove the subscription and when the UE is no longer served by the specific AMF, the AMF removes the subscription.

SMF+PGW/-C would know that a service with 5QI for voice is used based on QoS rules for voice received from PCF. PCF would know this based on Media Component description received from AF, and AF would know this inherently, e.g. a P-CSCF would know from service identifiers in SIP signalling. When having received the subscription information the SMF+PGW-C, PCF or AF must notify AMF prior to setup of QoS Flow for voice and await a response message from AMF. That SMF+PGW-C, PCF or AF must await a response message from AMF prior to setup of QoS flow could either be indicated by a specific indication in the subscription placed by AMF, or be default for this type of subscriptions. The notification from SMF+PGW-C, PCF or AF must either include an indication that a response from AMF is required, i.e., "please inform me when to progress resource allocation", or the AMF is mandated to always respond to such notifications from SMF+PGW-C, PCF or AF.

When AMF receives a notification of QoS Flow for voice establishment, AMF takes a decision if the QoS Flow can be setup in native access or if the UE should move to 4G by ordering a handover in gNB. AMF could use configured knowledge that the gNBs in the geographic area do not support 5QI for voice. The reason for allowing two sets of decisions is to allow for a greater geographic coverage for subscription than for the actual handover, and thereby optimizing signalling needed in the network. After having sent the Notification (with a possible addition that a response is needed from AMF to progress resource allocation) to the AMF, the SMF+PGW-C, PCF or AF buffers any 5GC signalling that is needed to setup the required QoS Flow.

The AMF responds to the notification from SMF+PGW-C, PCF or AF, since it has either been indicated that a response from AMF is needed in the notification or that such response is mandatory, with a "notification" response message and a cause. The cause could indicate that the QoS Flow setup can proceed, UE was not in an area that requires handover, or it could indicate that the SMF+PGW-C, PCF or AF shall continue to wait with the further setup until confirmation of RAT change to 4G has been received, AMF will order the gNB to perform HO and SMF+PGW-C, PCF and AF have subscribed to be informed about RAT change. Further, a RAT change, a cancellation of the subscription from AMF or an AMF relocation without a new subscription being placed from the new AMF should all allow the SMF+PGW-C, PCF or AF to proceed with the setup of required resources.

There are, proposed herein, various embodiments which address one or more of the issues disclosed herein. Certain embodiments may provide one or more of the following technical advantages. For instance, certain embodiments enable voice-centric UEs to camp on NR/5G-RAN—even if the subscriber is not entitled for voice on 5G or there is no capacity for voice calls—and initiate handover to LTE which is already QoS enabled for voice at call setup (or vice versa). Furthermore, according to certain embodiments, handover to neighbor cell of eNB connected to EPC will be triggered by CN if a service requiring QoS for voice media is initiated. The Handover from 5G to 4G (or vice versa) will be already be initiated prior to resources being allocated in RAN (and in core).

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 3:
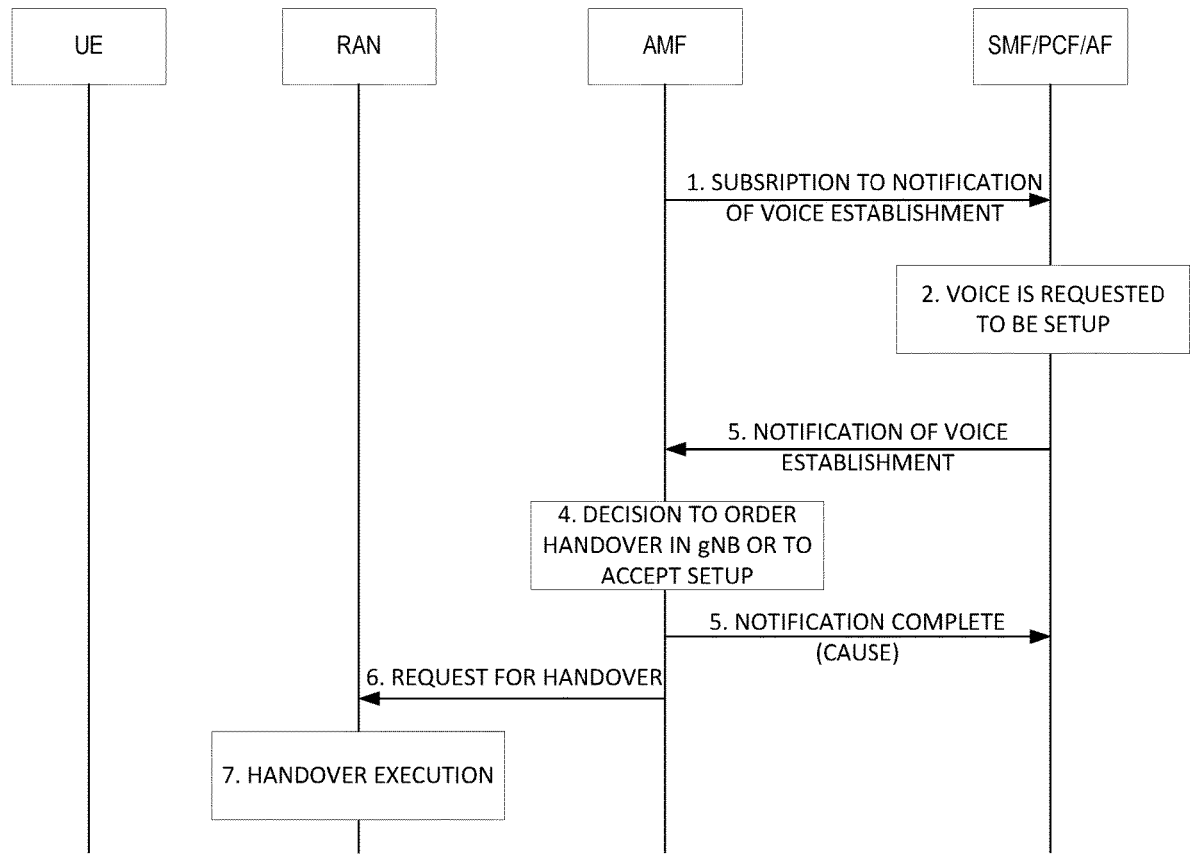
FIG. 3 shows a flow diagram according to certain examples in accordance with the present disclosure.

FIG. 3 shows a flow diagram according to certain embodiments proposed herein. The steps may be performed by the appropriate network functions/entities shown in FIGS. 2 and 3, and described in more detail in the Figures that follow.

1. AMF subscribes to a notification of voice (or some other service X) establishment. Such subscription needs to be standardized for one remote entity but could be placed on any of SMF+PGW-C, PCF or AF. The AMF may subscribe to such notification for all subscribers or per subscriber. In the latter case, the AMF has received information from UDM that the subscriber is entitled for voice service or service X, but only on 4G and not on 5G. The subscription can also be placed only when the UE is in a specific geographic area known to the AMF.
2. Detection of voice service, either:
    SMF+PGW-C detects voice based on 5QI suitable for voice received in policy rules from PCF, or
    PCF detects voice in Media Component description received from AF, or
    AF knows inherently that voice is about to be used (e.g. based on service identifier).
3. SMF+PGW-C, PCF or AF sends a notification to AMF that a voice service is about to be established. At this stage the SMF+PGW-C, PCF or AF buffer further messages that are intended for establishing a QoS Flow. Note that the SMF+PGW-C, PCF or AF only buffer further messages if having received the subscription in step 1.
4. Based on received notification in step 3, and possibly also if the gNBs in the geographic area supports QFI for voice, the AMF decides to order a handover in gNB, or if the UE is camping in such area or in such gNB that a setup is estimated to be successful
5. AMF sends a "notification" response message to SMF+PGW-C, PCF or AF indicating (indicated by cause in figure above) that the QoS Flow setup can proceed (UE was not in an area that requires handover) and not further detailed in the figure. Alternatively, it could indicate that the SMF+PGW-C, PCF or AF should wait with the setup until confirmation of RAT change has been received (AMF will order the gNB to perform HO).
6. AMF sends a request for handover to gNB
7. RAN executes on the request for handover and moves the UE from 5G to 4G.

After RAT change have occurred and SMF+PGW-C, PCF or AF is notified of this, the setup of the required QoS continues. Note that SMF+PGW-C may need to send QoS in Rel 8 format to setup the required resources. It will be appreciated that the methods described above are exemplary in nature, and certain steps may be combined, omitted, or modified in order, as necessary. The networks and nodes/entities in which these steps are performed will now be described in more detail.

Figure 4:
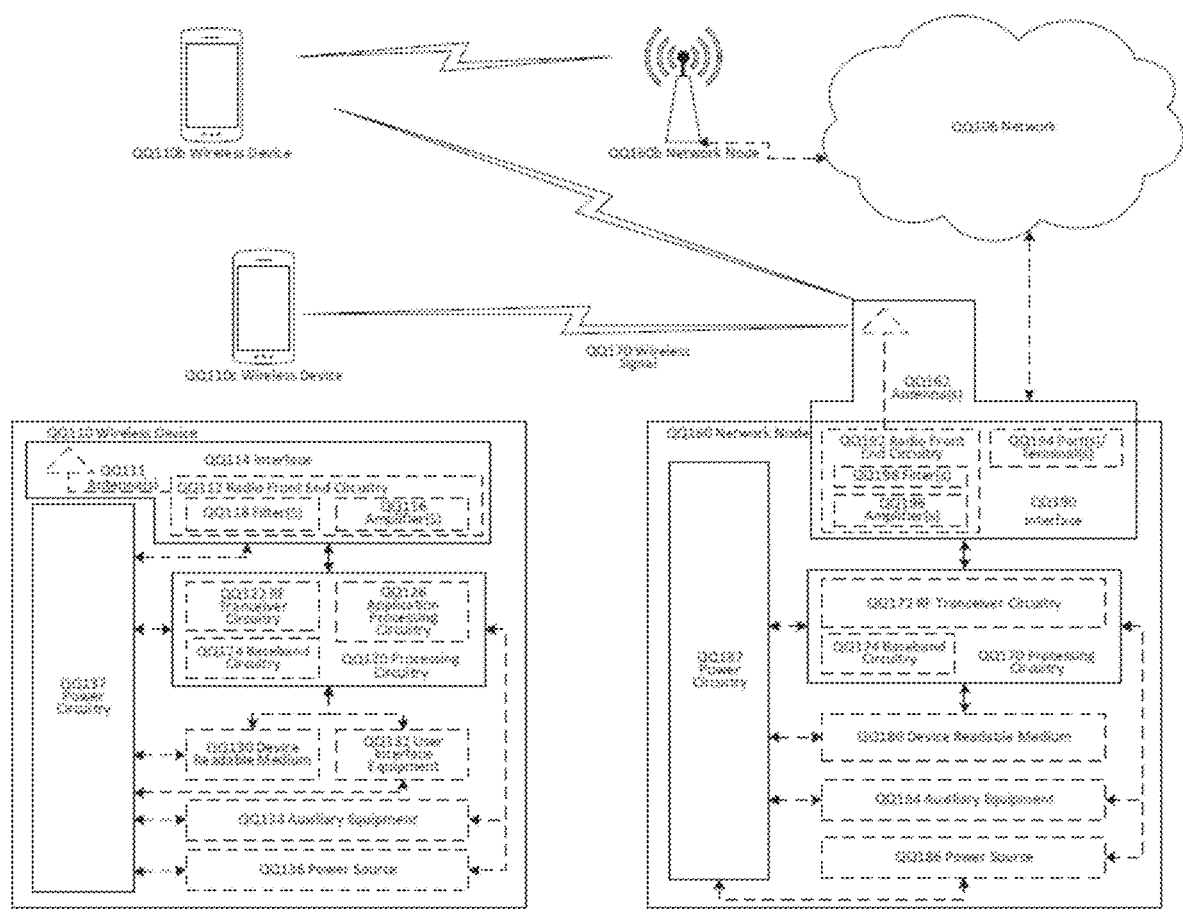
FIG. 4 discloses a wireless network in accordance with some examples according to the present disclosure.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network QQ106, network functions QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network function or end device. Of the illustrated components, network function QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network function QQ160 and WD QQ110 comprise various components described in more detail below. These components work together in order to provide network function and/or wireless device functionality, such as providing wireless connections in a wireless network. In different embodiments, the wireless network may comprise any number of wired or wireless networks, network functions, base stations, controllers, wireless devices, relay stations, and/or any other components or systems that may facilitate or participate in the communication of data and/or signals whether via wired or wireless connections.

As used herein, network function refers to equipment capable, configured, arranged and/or operable to communicate directly or indirectly with a wireless device and/or with other network functions or equipment in the wireless network to enable and/or provide wireless access to the wireless device and/or to perform other functions (e.g., administration) in the wireless network. Examples of network functions include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network function may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network functions include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network functions (e.g., MSCs, MMEs), O&M nodes, OSS nodes, SON nodes, positioning nodes (e.g., E-SMLCs), and/or MDTs. As another example, a network function may be a virtual network function as described in more detail below. More generally, however, network functions may represent any suitable device (or group of devices) capable, configured, arranged, and/or operable to enable and/or provide a wireless device with access to the wireless network or to provide some service to a wireless device that has accessed the wireless network.

In FIG. 4, network function QQ160 includes processing circuitry QQ170, device readable medium QQ180, interface QQ190, auxiliary equipment QQ184, power source QQ186, power circuitry QQ187, and antenna QQ162. Although network function QQ160 illustrated in the example wireless network of FIG. 4 may represent a device that includes the illustrated combination of hardware components, other embodiments may comprise network functions with different combinations of components. It is to be understood that a network function comprises any suitable combination of hardware and/or software needed to perform the tasks, features, functions and methods disclosed herein. Moreover, while the components of network function QQ160 are depicted as single boxes located within a larger box, or nested within multiple boxes, in practice, a network function may comprise multiple different physical components that make up a single illustrated component (e.g., device readable medium QQ180 may comprise multiple separate hard drives as well as multiple RAM modules).

Similarly, network function QQ160 may be composed of multiple physically separate components (e.g., a NodeB component and a RNC component, or a BTS component and a BSC component, etc.), which may each have their own respective components. In certain scenarios in which network function QQ160 comprises multiple separate components (e.g., BTS and BSC components), one or more of the separate components may be shared among several network functions. For example, a single RNC may control multiple NodeB's. In such a scenario, each unique NodeB and RNC pair, may in some instances be considered a single separate network function. In some embodiments, network function QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATS). Network function QQ160 may also include multiple sets of the various illustrated components for different wireless technologies integrated into network function QQ160, such as, for example, GSM, WCDMA, LTE, NR, WiFi, or Bluetooth wireless technologies. These wireless technologies may be integrated into the same or different chip or set of chips and other components within network function QQ160.

Processing circuitry QQ170 is configured to perform any determining, calculating, or similar operations (e.g., certain obtaining operations) described herein as being provided by a network function. These operations performed by processing circuitry QQ170 may include processing information obtained by processing circuitry QQ170 by, for example, converting the obtained information into other information, comparing the obtained information or converted information to information stored in the network function, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network function QQ160 components, such as device readable medium QQ180, network function QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network function, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network function QQ160, but are enjoyed by network function QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network function QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network function QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network functions or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network function QQ16 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network function QQ160 and may be connectable to network function QQ160 through an interface or port.

Antenna QQ162, interface QQ190, and/or processing circuitry QQ170 may be configured to perform any receiving operations and/or certain obtaining operations described herein as being performed by a network function. Any information, data and/or signals may be received from a wireless device, another network function and/or any other network equipment. Similarly, antenna QQ162, interface QQ190, and/or processing circuitry QQ170 may be configured to perform any transmitting operations described herein as being performed by a network function. Any information, data and/or signals may be transmitted to a wireless device, another network function and/or any other network equipment.

Power circuitry QQ187 may comprise, or be coupled to, power management circuitry and is configured to supply the components of network function QQ160 with power for performing the functionality described herein. Power circuitry QQ187 may receive power from power source QQ186. Power source QQ186 and/or power circuitry QQ187 may be configured to provide power to the various components of network function QQ160 in a form suitable for the respective components (e.g., at a voltage and current level needed for each respective component). Power source QQ186 may either be included in, or external to, power circuitry QQ187 and/or network function QQ160. For example, network function QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network function QQ160 may include additional components beyond those shown in FIG. 4 that may be responsible for providing certain aspects of the network function's functionality, including any of the functionality described herein and/or any functionality necessary to support the subject matter described herein. For example, network function QQ160 may include user interface equipment to allow input of information into network function QQ160 and to allow output of information from network function QQ160. This may allow a user to perform diagnostic, maintenance, repair, and other administrative functions for network function QQ160.

As used herein, wireless device (WD) refers to a device capable, configured, arranged and/or operable to communicate wirelessly with network functions and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network function. The WD may in this case be a machine-to-machine (M2M) device, which may in a 3GPP context be referred to as a machine-type communication (MTC) device. As one particular example, the WD may be a UE implementing the 3GPP narrow band Internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137, WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110. Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network function and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network functions or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RE signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 5:
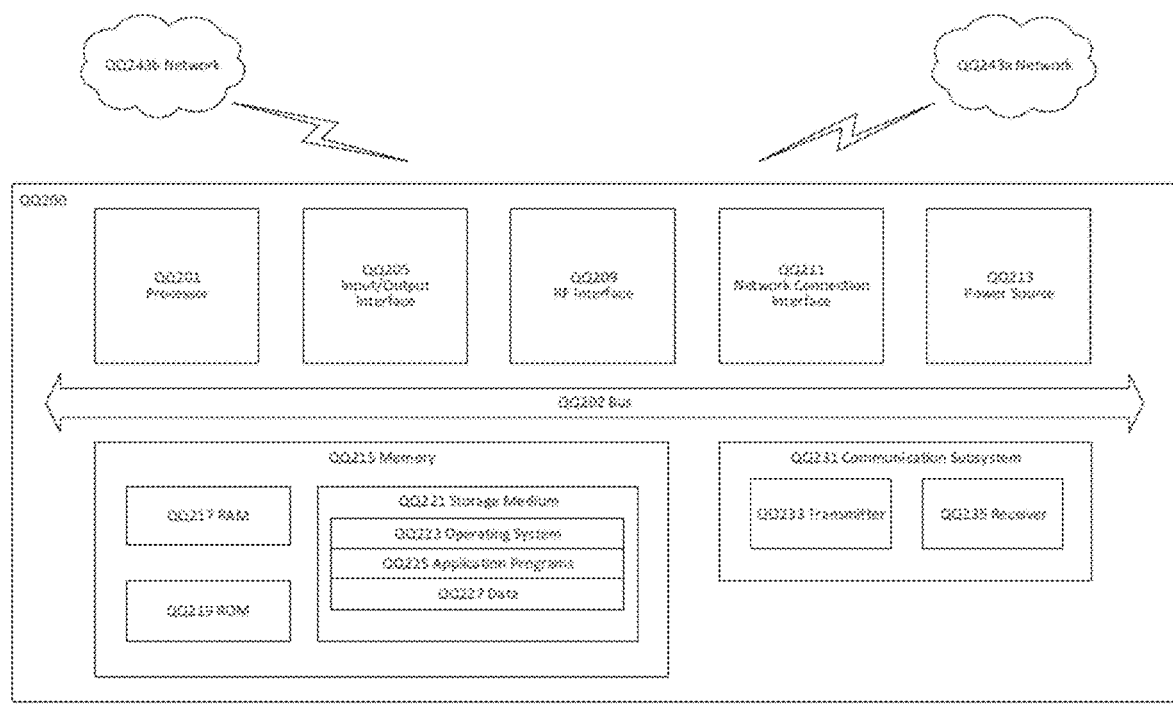
FIG. 5 discloses a User Equipment in accordance with some examples according to the present disclosure.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NBIoT UE that is not intended for sale to, or operation by, a human user. UE QQ200, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE QQ200 includes processing circuitry QQ201 that is operatively coupled to input/output interface QQ205, radio frequency (RE) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof.

Storage medium QQ221 includes operating system QQ223, application program QQ225, and data QQ227. In other embodiments, storage medium QQ221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 5, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231.

In another example, the non-computationally intensive functions of any of such components may be implemented in software or firmware and the computationally intensive functions may be implemented in hardware.

Figure 6:
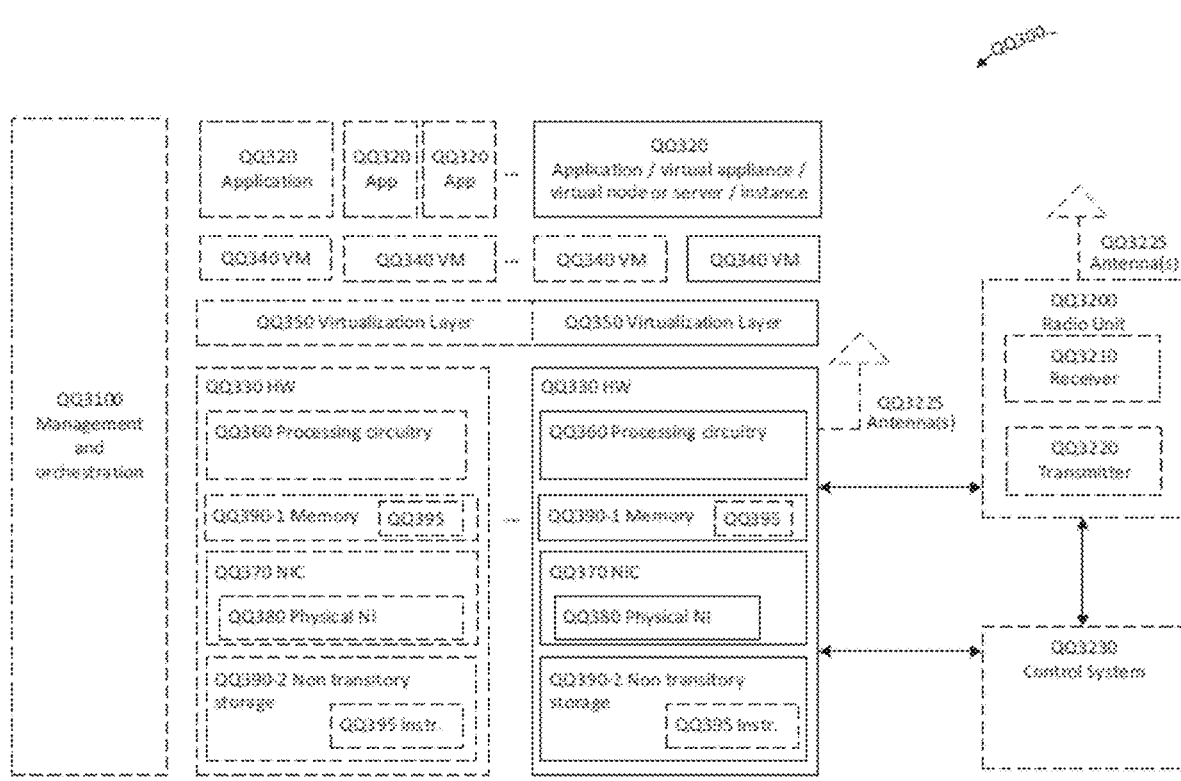
FIG. 6 discloses a virtualization environment in accordance with some examples according to the present disclosure.

FIG. 6 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network function), then the network function may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors, Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 6, hardware QQ330 may be a standalone network function with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 6.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 7:
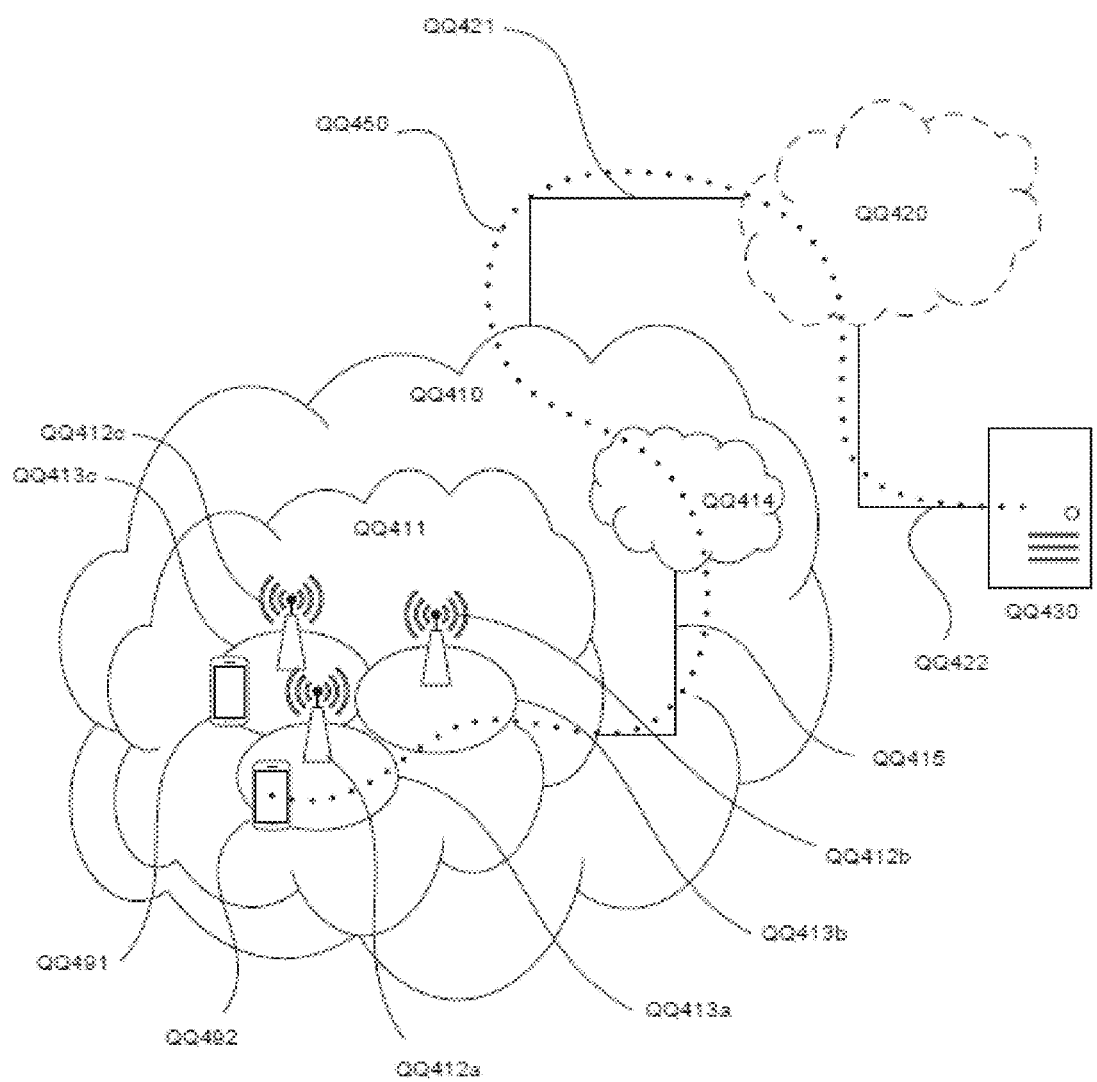
FIG. 7 discloses a telecommunication network connected via an intermediate network to a host computer.

With reference to FIG. 7, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 7 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 8. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 8) served by base station QQ520. Communication interface QQ526 may be configured to facilitate connection QQ560 to host computer QQ510, Connection QQ560 may be direct or it may pass through a core network (not shown in FIG. 8) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 8:
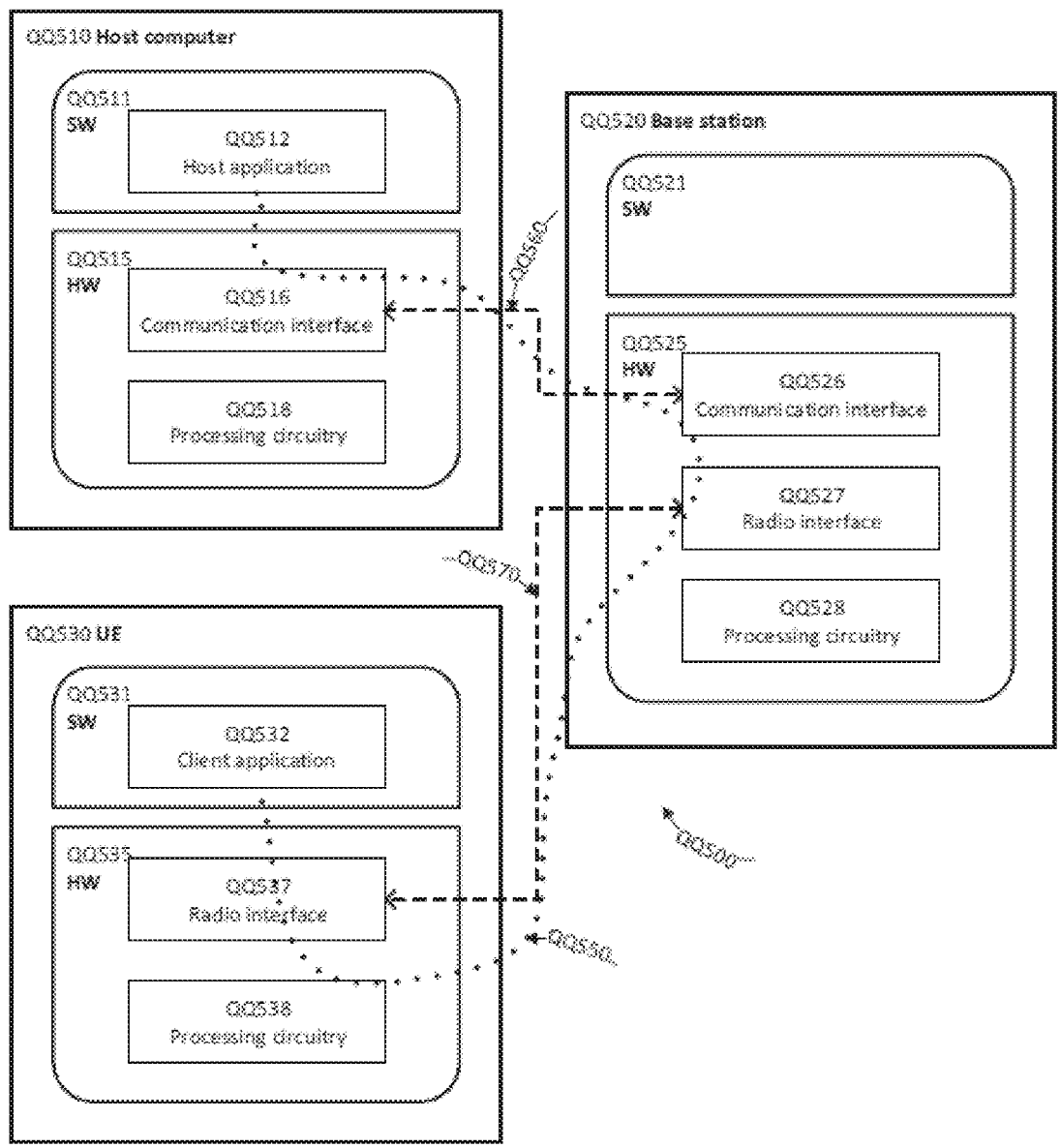
FIG. 8 discloses a host computer communicating via a base station with a user equipment over a partially wireless connection.

It is noted that host computer QQ510, base station QQ520 and UE QQ530 illustrated in FIG. 8 may be similar or identical to host computer QQ430, one of base stations QQ412a, QQ412b, QQ412c and one of UEs QQ491, QQ492 of FIG. 7, respectively. This is to say, the inner workings of these entities may be as shown in FIG. 8 and independently, the surrounding network topology may be that of FIG. 7.

In FIG. 8, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the data rate and latency, and thereby provide benefits such as reduced user waiting time, better responsiveness, and improved performance. A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

Abbreviation Explanation

5GC 5G Core network (same as NGC)
DC Dual Connectivity
gNB 5G NB
AMF Access and Mobility Management Function
NGC Next Gen Core network
SMF Session Management Function
IWF Interworking Function
1xRTT CDMA2000 1xRadio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR (corresponding to eNB in LTE)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink ControlChannel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method implemented by a Mobility Management node in a core network of handing over a User Equipment (UE) from a first type of Radio Access Technology (RAT) to a second type of RAT, wherein the UE is attached to the core network via a Radio Access Network (RAN) utilizing the first type of RAT, the method comprising:
receiving, from a network function in the core network, an indication that a particular service is to be invoked for the UE, wherein the indication is received prior to setup of a Quality of Service (QoS) flow for the particular service;
determining that the UE is to be handed over from the first type of RAT to the second type of RAT for supporting the particular service;
responsive to determining that the UE is to be handed over to the second type of RAT, sending an indication to wait for confirmation that the handover is completed before continuing with the setup of the QoS flow; and
requesting, by the Mobility Management node, the RAN to hand over the UE from the first RAT to the second RAT before the setup of the QoS flow for the particular service for the UE is completed.

2. The method of claim 1, wherein the method further comprises, prior to the receiving, the Mobility Management node subscribing to the network function for receiving notifications whenever the particular service is to be invoked for the UE.

3. The method of claim 1, wherein the method further comprises informing, by the Mobility Management node, the network function that the UE is to be handed over from the first RAT to the second RAT for the particular service.

4. The method of claim 1, wherein the method further comprises:
receiving a confirmation from the RAN that the UE is handed over from the first RAT to the second RAT, the confirmation being a confirmation of mobility for the UE;
transmitting the confirmation to the network function.

5. The method of claim 1, wherein the determining comprises the Mobility Management node determining that the particular service requires a Quality of Service that the first type of RAT is at least momentary not able to support.

6. The method of claim 1, wherein the network function is any of:
a Session Management Function+Packet gateway node;
a Policy Control Function node;
an Application Function node.

7. A method implemented by a network function in a core network of supporting the handing over a User Equipment (UE) from a first type of Radio Access Technology (RAT) to a second type of RAT, wherein the UE is attached to the core network via a Radio Access Network (RAN) utilizing the first type of RAT, the method comprising:
receiving, from a Mobility Management node in the core network, a subscription request for receiving notifications whenever a particular service is to be invoked for the UE;
determining that the particular service is to be invoked for the UE; and
transmitting, by the network function and to the Mobility Management node, an indication that the particular service is to be invoked for the UE, wherein the transmitting is performed before setup of a Quality of Service (QoS) flow for the particular service is completed;
suspending setup of the QoS flow for the particular service to wait for a handover from the first type of RAT to a second type of RAT for supporting the particular service;
resuming the setup of the QoS flow for the particular service when the handover from the first type of RAT to the second type of RAT is completed.

8. The method of claim 7, further comprising:
receiving, by the network function and from the Mobility Management node, an information message that the UE is to be handed over from the first RAT to the second RAT for the particular service;
suspending, by the network function, establishment of the particular service to be invoked for the UE.

9. The method of claim 8, further comprising:
receiving, by the network function, a confirmation that the UE is handed over from the first RAT to the second RAT, the confirmation being a confirmation of mobility for the UE;
unsuspending, by the network function, establishment of the particular service to be invoked for the UE.

10. A Mobility Management node configured to operate in a core network and configured to support handing over a User Equipment (UE) from a first type of Radio Access Technology (RAT) to a second type of RAT, wherein the UE is attached to a core network via a Radio Access Network (RAN) utilizing the first type of RAT, the Mobility Management node comprising:
receive circuitry configured to receive, from a network function in the core network, an indication that a particular service is to be invoked for the UE, wherein the indication is received prior to setup of a Quality of Service (QoS) flow for the particular service;
inform circuitry configured to send, responsive to determining that the UE is to be handed over to the second type of RAT, an indication to wait for confirmation that the handover is completed before continuing with the setup of the QoS flow;
processing circuitry configured to determine that the UE is to be handed over from the first type of RAT to the second type of RAT for supporting the particular service; and
transmit circuitry configured to request, before setup of the QoS flow for the particular service for the UE is completed, the RAN to hand over the UE from the first RAT to the second RAT.

11. The Mobility Management node of claim 10, wherein the node further comprises subscribe circuitry configured to subscribe, to the network function, for receiving notifications whenever the particular service is to be invoked for the UE.

12. The Mobility Management node of claim 10:
wherein the receive circuitry is further configured to receive, from the RAN, a confirmation that the UE is handed over from the first RAT to the second RAT; and wherein the transmit circuitry is further configured to transmit the confirmation to the network function.

13. The Mobility Management node of claim 10, wherein the processing circuitry is further configured to determine that the particular service requires a Quality of Service that the first type of RAT is at least momentary not able to support.

14. A network node in a core network and configured to support the handing over a User Equipment (UE) from a first type of Radio Access Technology (RAT) to a second type of RAT, wherein the UE is attached to a core network via a Radio Access Network (RAN) utilizing the first type of RAT, the network node comprising:
  receive circuitry configured to receive, from a Mobility Management node in the core network, a subscription request for receiving notifications whenever a particular service is to be invoked for the UE;
  processing circuitry configured to determine that the particular service is to be invoked for the UE; and
  transmit circuitry configured to transmit, before setup of a Quality of Service (QoS) flow for the particular service for the UE is complete, an indication that the particular service is to be invoked for the UE;
  suspend circuitry configured to:
    suspend the setup of the QoS flow for the particular service to wait for a handover of the UE from the first type of RAT to the second type of RAT; and
    resume the setup of the QoS flow for the particular service when the handover form the first type of RAT to the second type of RAT is completed.

15. The network node of claim 14:
  wherein the receive circuitry is further configured to receive, from the Mobility Management node, an information message that the UE is to be handed over from the first RAT to the second RAT for the particular service; and
  wherein the suspend circuitry configured to suspend of the setup of the QoS flow for the particular service responsive to the information message.

16. The network node of claim 15:
  wherein the receive circuitry is further configured to receive a confirmation that the UE is handed over from the first RAT to the second RAT; and
  wherein the suspend circuitry is further configured to unsuspend the establishment of the particular service to be invoked for the UE.

17. The network node of claim 14, wherein the node is configured to perform any of:
  a Session Management Function+Packet gateway;
  a Policy Control Function;
  an Application Function.

18. A non-transitory computer readable recording medium storing a computer program product for controlling handing over a User Equipment (UE) from a first type of Radio Access Technology (RAT) to a second type of RAT, wherein the UE is attached to a core network via a Radio Access Network (RAN) utilizing the first type of RAT, the computer program product comprising software instructions which, when run on processing circuitry of a Mobility Management node in the core network, causes the Mobility Management node to:
  receive, from a network function in the core network, an indication that a particular service is to be invoked for the UE, wherein the indication is received prior to setup of a Quality of Service (QoS) flow for the particular service;
  determine that the UE is to be handed over from the first type of RAT to the second type of RAT for supporting the particular service;
  responsive to determining that the UE is to be handed over to the second type of RAT, send an indication to wait for confirmation that the handover is completed before continuing with the setup of the QoS flow; and
  request, before the setup of the QoS flow for the particular service for the UE is completed, the RAN to hand over the UE from the first RAT to the second RAT.

19. A non-transitory computer readable recording medium storing a computer program product for controlling support of handing over a User Equipment (UE) from a first type of Radio Access Technology (RAT) to a second type of RAT, wherein the UE is attached to a core network via a Radio Access Network (RAN) utilizing the first type of RAT, the computer program product comprising software instructions which, when run on processing circuitry of a network function in the core network, causes the network function to:
  receive, from a Mobility Management node in the core network, a subscription request for receiving notifications whenever a particular service is to be invoked for the UE;
  determine that the particular service is to be invoked for the UE; and
  transmit, to the Mobility Management node and before the setup of the QoS flow for the particular service for the UE is completed, an indication that the particular service is to be invoked for the UE;
  suspend the setup of the QoS flow for the particular service to wait for a handover from the first type of RAT to a second type of RAT for supporting the particular service; and
  resume the setup of the QoS flow for the particular service when the handover from the first type of RAT to the second type of RAT is completed.

* * * * *